United States Patent
Wang et al.

(10) Patent No.: US 8,852,326 B2
(45) Date of Patent: Oct. 7, 2014

(54) AGGREGATES OF SMALL PARTICLES OF SYNTHETIC FAUJASITE ZEOLITE

(75) Inventors: Kun Wang, Bridgewater, NJ (US); Robert C. Lemon, Easton, PA (US); John S. Buchanan, Lambertville, NJ (US); Christine E. Kliewer, Clinton, NJ (US); Wieslaw J. Roth, Sewell, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 21 days.

(21) Appl. No.: 13/041,597

(22) Filed: Mar. 7, 2011

(65) Prior Publication Data

US 2012/0227584 A1    Sep. 13, 2012

(51) Int. Cl.
*B01D 53/02* (2006.01)
*C01B 39/24* (2006.01)
(Continued)

(52) U.S. Cl.
CPC ............ *B01D 53/02* (2013.01); *B01D 2255/50* (2013.01); *C01B 39/24* (2013.01); *B01J 20/3007* (2013.01); *B01J 20/3042* (2013.01); *B01J 20/28071* (2013.01); *C01P 2006/12* (2013.01); *B01J 29/12* (2013.01); *Y02C 10/08* (2013.01); *B01D 2257/504* (2013.01); *B01J 29/123* (2013.01); *B01J 29/163* (2013.01); *B01J 35/023* (2013.01);
(Continued)

(58) Field of Classification Search
CPC ...................... B01D 2253/108; B01D 2255/50; B01D 2256/12; B01D 2257/504; B01D 53/02; B01J 20/18; B01J 20/186; B01J 20/28004; B01J 20/2803; B01J 20/28057; B01J 20/28071; B01J 20/3007; B01J 20/3042; B01J 29/12; B01J 29/123; B01J 29/126; B01J 29/16; B01J 29/163; B01J 29/166; B01J 35/002; B01J 35/0026; C01B 39/20; C01B 39/24; C01P 2006/12; C01P 2006/14; C01P 2006/16; Y02C 10/08
USPC ............................ 95/90, 139; 502/79; 96/108
See application file for complete search history.

(56) References Cited

U.S. PATENT DOCUMENTS 3,293,192 A    12/1966   Maher et al.
3,306,922 A *  2/1967    Barrer et al. .................. 556/173
(Continued)

FOREIGN PATENT DOCUMENTS

DE    2510740 C2    9/1976
GB    1058188       2/1967
(Continued)

OTHER PUBLICATIONS

G.T. Kerr, "Hydrogen Zeolite Y, Ultrastable Zeolite Y, and Aluminum-Deficient Zeolites"—Chapter 19 in W. Meier, et al. Advances in Chemistry, American Chemical Society, Washington, DC, 1973.

(Continued)

*Primary Examiner* — Christopher P Jones
(74) *Attorney, Agent, or Firm* — Chad A. Guice

(57) ABSTRACT

This invention relates to aggregates of small particles of synthetic faujasite zeolite. Small primary particles of zeolite are clustered into larger secondary particles. The observable average width of the primary particles may be 0.3 micron or less and the observable average width of the secondary particles may be 0.8 micron or more. The silica to alumina ratio of the zeolite may be less than 4:1.

14 Claims, 3 Drawing Sheets

(51) Int. Cl.
| | |
|---|---|
| *B01J 20/30* | (2006.01) |
| *B01J 20/28* | (2006.01) |
| *B01J 29/12* | (2006.01) |
| *B01J 29/16* | (2006.01) |
| *B01J 35/02* | (2006.01) |
| *B01J 20/18* | (2006.01) |
| *B01J 35/00* | (2006.01) |
| *C01B 39/20* | (2006.01) |

(52) U.S. Cl.
CPC ........ *B01J 29/166* (2013.01); *B01J 20/18* (2013.01); *C01P 2006/14* (2013.01); *B01D 2256/12* (2013.01); *B01J 29/16* (2013.01); *B01J 35/0026* (2013.01); *C01B 39/20* (2013.01); *B01J 29/126* (2013.01); *B01J 20/2803* (2013.01); *B01D 2253/108* (2013.01); *B01J 35/002* (2013.01); *B01J 20/186* (2013.01); *B01J 20/28004* (2013.01); *B01J 20/28057* (2013.01); *C01P 2006/16* (2013.01)
USPC ...................... 96/108; 95/90; 95/139; 502/79

(56) References Cited

U.S. PATENT DOCUMENTS

| | | | |
|---|---|---|---|
| 3,343,913 A | 9/1967 | Robson | |
| 3,354,078 A | 11/1967 | Miale et al. | |
| 3,402,996 A | 9/1968 | Maher et al. | |
| 3,442,795 A | 5/1969 | Kerr et al. | |
| 3,493,519 A | 2/1970 | Kerr et al. | |
| 3,506,400 A | 4/1970 | Eberly, Jr. et al. | |
| 3,516,786 A | 6/1970 | Maher et al. | |
| 3,591,488 A | 7/1971 | Eberly, Jr. et al. | |
| 3,640,681 A | 2/1972 | Pickert | |
| 3,690,823 A | 9/1972 | Young | |
| 3,691,099 A | 9/1972 | Young | |
| 3,808,326 A | 4/1974 | McDaniel et al. | |
| 3,836,561 A | 9/1974 | Young | |
| 3,864,282 A | 2/1975 | Young | |
| 3,878,128 A * | 4/1975 | Rosback | 423/715 |
| 3,937,791 A | 2/1976 | Garwood et al. | |
| 4,093,560 A | 6/1978 | Kerr et al. | |
| 4,123,390 A * | 10/1978 | Sherman et al. | 426/561 |
| 4,218,307 A | 8/1980 | McDaniel | |
| 4,273,753 A | 6/1981 | Chang | |
| 4,737,478 A * | 4/1988 | Rainis | 502/8 |
| 5,340,957 A * | 8/1994 | Clark | 208/59 |
| 5,531,808 A | 7/1996 | Ojo et al. | |
| 5,620,590 A | 4/1997 | Absil et al. | |
| 5,849,258 A | 12/1998 | Lujano et al. | |
| 5,902,564 A | 5/1999 | Lujano et al. | |
| 5,993,773 A | 11/1999 | Funakoshi et al. | |
| 6,143,057 A * | 11/2000 | Bulow et al. | 95/96 |
| 6,241,960 B1 * | 6/2001 | Topsøe et al. | 423/700 |
| 6,261,441 B1 * | 7/2001 | Gentry et al. | 208/58 |
| 6,284,218 B1 | 9/2001 | Kuvettu et al. | |
| 6,306,363 B1 | 10/2001 | Funakoshi et al. | |
| 6,395,070 B1 * | 5/2002 | Bhadha et al. | 95/117 |
| 6,414,071 B1 * | 7/2002 | Wypart et al. | 524/450 |
| 6,425,940 B1 * | 7/2002 | Chao et al. | 95/130 |
| 6,596,256 B1 * | 7/2003 | Ojo et al. | 423/700 |
| 6,746,659 B2 | 6/2004 | Pinnavaia et al. | |
| 6,843,977 B2 * | 1/2005 | Pinnavaia et al. | 423/702 |
| 6,902,664 B2 * | 6/2005 | Timken | 208/111.01 |
| 7,605,295 B1 * | 10/2009 | Lafyatis et al. | 585/475 |
| 2003/0044350 A1 | 3/2003 | Lam et al. | |
| 2004/0138051 A1 | 7/2004 | Shan et al. | |
| 2005/0239634 A1 | 10/2005 | Ying et al. | |
| 2006/0175231 A1 * | 8/2006 | Hansen et al. | 208/120.01 |
| 2007/0244347 A1 | 10/2007 | Ying et al. | |
| 2007/0272593 A1 * | 11/2007 | Stockwell et al. | 208/111.01 |
| 2008/0138274 A1 | 6/2008 | Garcia-Martinez | |
| 2008/0200742 A1 * | 8/2008 | Doyle et al. | 585/477 |
| 2008/0214882 A1 | 9/2008 | Pinnavaia et al. | |
| 2009/0029847 A1 | 1/2009 | Euzen et al. | |
| 2009/0090657 A1 | 4/2009 | Ying et al. | |
| 2009/0326311 A1 * | 12/2009 | Cheng et al. | 585/828 |
| 2010/0113854 A1 * | 5/2010 | Bouvier et al. | 585/828 |
| 2010/0147747 A1 | 6/2010 | Elia et al. | |
| 2011/0011804 A1 * | 1/2011 | Cheng et al. | 210/672 |

FOREIGN PATENT DOCUMENTS

| | | |
|---|---|---|
| GB | 1061847 | 3/1967 |
| JP | 53101003 | 9/1978 |
| NL | 7604264 | 4/1976 |

OTHER PUBLICATIONS

Letter to the Editors, "Superactive Crystalline Aluminosilicate Hydrocarbon Catalysts", Journal of Catalysis, 4, 1965, pp. 527-529.
H. Julide Koroglu, et al., "Effects of low-temperature gel aging on the synthesis of zeolite Y at different alkalinities", Journal of Crystal Growth, 241, 2002, pp. 481-488.
C. Berger, et al., "The synthesis of large crystals of zeolite Y revisited", Microporous and Mesoporous Materials, 83, 2005, pp. 333-344.
J. N. Miale, et al., "Catalysis by Crystalline Aluminosilicates IV. Attainable Catalytic Cracking Rate Constants, and Superactivity", Journal of Catalysis, 6, 1966, pp. 278-287.
C. T. Campbell, et al., "The Adsorption, Desorption, and Reactions of CO and O2 on Rh2", Journal of Catalysis, 54, 1978, pp. 289-302.
K. Rajagopalan, et al., "Influence of Zeolite Particle Size on Selectivity During Fluid Catalytic Cracking", Applied Catalysis, 23, 1986, pp. 69-80.
D. H. Olson, et al., "Chemical and Physical Properties of the ZSM-5 Substitutional Series", Journal of Catalysis, 61, 1980, pp. 390-396.
Shigeo Miwa, editor, "Powder Engineering Theory", 1981, Nikkan Kogyo Shinbun KK, pp. 1-31.

* cited by examiner

AGGREGATES OF SMALL PARTICLES OF SYNTHETIC FAUJASITE ZEOLITE

FIELD OF THE INVENTION

This invention relates to aggregates of small particles of synthetic faujasite zeolite. Small primary crystallites of zeolite are clustered into larger secondary particles. When the surfaces of the secondary particles are viewed, e.g., in a SEM image, the average width of the primary crystallites may be 0.3 micron or less. In contrast, when the surfaces of the secondary particles are viewed, e.g., in a SEM image, the average width of the secondary particles may be 0.8 micron or more. The silica to alumina ratio of the zeolite may be less than 4:1.

Methods for making the aggregates are also disclosed. The aggregates may be used as absorbents, as catalysts or as supports for catalysts.

BACKGROUND OF THE INVENTION

Zeolite Y, a member of the Faujasite family, is widely used in many catalytic processes such as fluid catalytic cracking (FCC), hydrocracking, aromatics alkylation, and aromatics transalkylation. A particular type of zeolite Y is known as ultra-stable Y zeolite (USY). Typical USY has a crystal morphology of non-aggregated and submicrosized crystals and may contain intra-crystal mesopores after post-treatment involving high temperature steaming. The individual submicrosized crystals may have crystal defects which produce variously oriented crystal grains within an individual crystal particle. The Kuvettu et al U.S. Pat. No. 6,284,218 states that such defects include stacking faults and screw defects.

When heavy molecules are processed by a catalyst, such as catalytic cracking of heavy gas oil, transport properties (both intra-particle and inter-particle) of the catalyst are important in order to operate outside of the diffusion limited regime which often leads to coking.

The article by K. Rajagopalan, A. W. Peters, G. C. Edwards, "Influence of Zeolite Particle Size on Selectivity During Fluid Catalytic Cracking", Applied Catalysis, 1986, 23, 69-80, reports that smaller particle size NaY zeolite fluid catalytic cracking (FCC) catalysts exhibited improved activity and selectivity to intermediate cracked products, such as gasoline and light cycle oil. Selectivity differences were said to be explained by considering the effect of diffusion resistance on the rate constants for cracking of gas oil and gasoline.

The Absil et al U.S. Pat. No. 5,620,590 reports that small crystal zeolite Y of less than 1 micron shows activity benefit in hydrocracking compared to larger crystals. However, small crystal zeolites often present problems in manufacturing (e.g., difficulties in filtration and formulation) due to their small particle sizes and low bulk density. Therefore, it is desirable to have zeolites that possess the performance advantages of small particles, while still maintaining the easy processibility of large particles. Thus, an ideal morphology of zeolites is one that consists of large secondary particles (often greater than 1 micron) formed by agglomeration of smaller primary particles (often less than or even much less than 1 micron). Furthermore, to improve mass transportation rates, there is a need to make zeolite crystals with small size or aggregated crystals containing inter-crystal mesopores for reducing diffusion limitations.

Conventional zeolite Y tends to have a crystal or primary particle size of much greater than 0.1 microns, even greater than 1 micron. Examples of disclosures which describe such conventional forms of zeolite Y include, the Robsin U.S. Pat. No. 3,343,913, the Young U.S. Pat. No. 3,690,823, and the McDaniel et al U.S. Pat. No. 3,808,326.

Small crystal size zeolite Y may be prepared by methods disclosed in the Maher et al U.S. Pat. No. 3,516,786 and the Young U.S. Pat. No. 3,864,282.

Zeolite X, zeolite Y and natural faujasite have identical structure types and differ only in the ratio of silica to alumina in the final crystal structure. For example, zeolite X is generally referred to as having a silica to alumina molar ratio of 2 to 3, whereas zeolite Y is generally referred to as having a silica to alumina molar ratio of 3 to 7.

The Funkakoshi et al U.S. Pat. Nos. 5,993,773 and 6,306,363 describe various forms of low-silica faujasite zeolite, referred to as LSX, having silica to alumina molar ratio of 1.9 to 2.1. These patents include SEM photographs showing particle size and morphology of LSX zeolites.

In the Funkakoshi et al U.S. Pat. No. 6,306,363, it is stated that, when zeolites are observed by Scanning Electron Microscope (SEM), they may be visible either (1) in the form of non-aggregated primary particles only, which are the smallest units of zeolite particles, or (2) in the form of secondary particles which are formed by agglomeration of a plurality of primary particles. Usually, primary particles of zeolites have their shapes predetermined depending upon the type of zeolite. For example, A-type zeolite tends to have a cubic shape, and faujasite-type zeolite tends to have an octahedral shape or a polyhedral shape having a generally spherical shape with some angularity developed as shown in FIG. 3 of the Funkakoshi et al U.S. Pat. No. 6,306,363. However, it is possible for faujasitie-type zeolites to have other shapes, such as elongated shapes (e.g., flattened octahedral shapes, hexagonal slabs or rod-like shapes).

Usually, particle sizes of these particles have a distribution about a certain value at its center. A method for obtaining an average particle size from particles having a distribution, is described in detail, for example, at pages 1 to 31 in "Powder Engineering Theory", edited by Shigeo Miwa, published in 1981 by Nikkan Kogyo Shinbun K. K. The primary particle may be described as a number average particle size of the diameters when the primary particles of the faujasite-type zeolite observed by a SEM are approximated to spheres which are called "projected area diameter" or "Heywood diameter".

LSX in the Funkakoshi et al U.S. Pat. No. 6,306,363 is described as being of high purity and characterized in its fine primary particle size. LSX in the Funkakoshi et al U.S. Pat. No. 6,306,363 has a primary particle size of at least 0.05 μm and less than 1 μm, which is said to be a fine primary particle size in comparison with previously known forms of LSX having a primary particle size of from 3 to 5 μm, and even small forms of LSX having a primary particle size of at least 1 μm. In the Funkakoshi et al U.S. Pat. No. 6,306,363, it is stated that, when fine LSX of high purity is used, for example, as an adsorbent of various substances, diffusion into the interior will be facilitated, and improvement in various dynamic properties can be expected.

The LSX described in the Funkakoshi et al U.S. Pat. No. 5,993,773 is said to be characterized not only by high purity, but also a peculiar primary particle size distribution. The LSX of the Funkakoshi et al U.S. Pat. No. 5,993,773 comprises particles having a smaller primary particle size and particles having a larger primary particle size, wherein the primary particle size of the smaller particles is from 1 μm to 8 μm, the primary particle size of the larger particles is from 5 μm to 15 μm, and the particles having a smaller primary particle size accounts for 90% or more of the total particle number. The right hand portion of FIG. 2 of the Funkakoshi et al U.S. Pat. No. 5,993,773 illustrates a large single crystal or primary particle having a spherical polyhedral shape with angularity or edges developed.

SUMMARY OF THE INVENTION

An aggregated form of a synthetic faujasite zeolite comprises small primary crystallites and secondary particles of larger size. At least 80%, e.g., at least 90%, e.g., at least 95%, of the primary crystallites may be aggregated or clustered to form the secondary particles. The ratio of the average width of the secondary particles to the average width of the primary crystallites, when the outer surfaces of the secondary particles are viewed, may be at least 5:1, for example, at least 10:1. The average width of the primary crystallites in a secondary particle may be 0.3 micron or less, for example, 0.2 micron or less, for example, 0.1 micron or less, when the outer surface of the secondary particle is viewed, e.g., in a SEM image. The average width of the secondary particles may be 0.8 micron or more, for example, 1.0 micron or more, for example, 2.0 microns or more, when the surfaces of the secondary particles are viewed. At least 80%, e.g., at least 90%, e.g., at least 95% of the secondary particles may comprise at least 5, for example, at least 10 primary crystallites. These primary crystallites and secondary particles as described above may be observable when the secondary particles are observed, e.g., by a SEM, under sufficient conditions, e.g., of magnification and resolution.

The average width of the primary crystallites and secondary particles is determined by viewing a sufficient two-dimensional SEM image of the secondary particles and approximating the shape of the primary crystallites and secondary particles as circles. When percentages (e.g., 80%, 90% and 95%) of primary crystallites and secondary particles are referred to herein, it will be understood that these percentages are based on numbers of these particles. Although SEM images referred to herein do not necessarily depict all of the particles an entire batch of primary crystallites and secondary particles, it will be understood that the SEM images referred to herein are representative of all of the particles an entire batch of primary crystallites and secondary particles, including those particles not specifically observed.

DETAILED DESCRIPTION OF THE INVENTION

Figure 1:
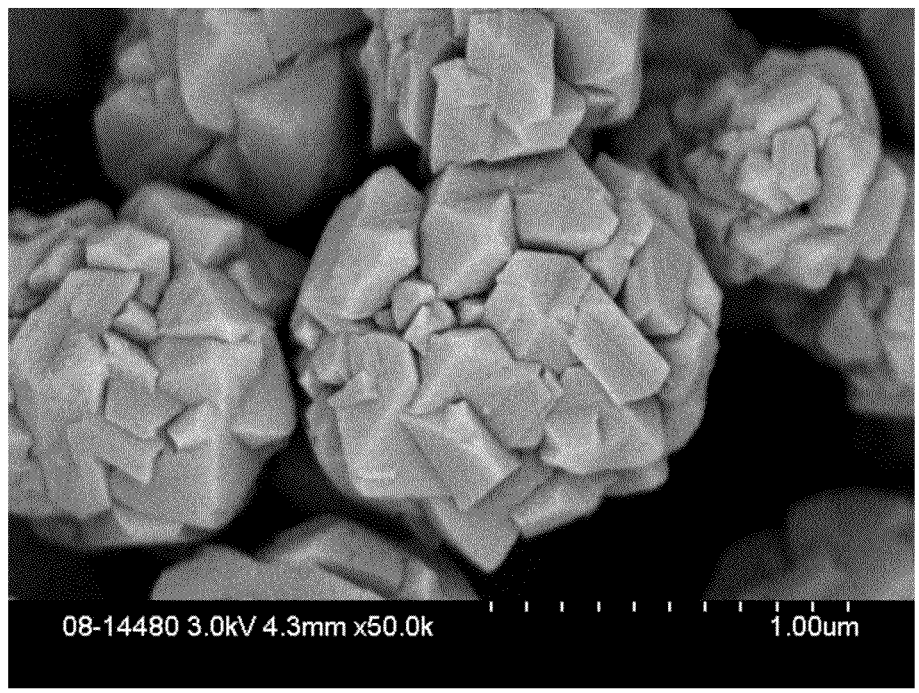
FIGS. 1 and 2 are scanning electron microscope (SEM) images of a NaY sample prepared in Example 1 herein.

Small crystallites of zeolite Y are clustered into larger particle size bodies. The larger particle size bodies are discrete. The small particle size crystallites are also referred to herein as primary crystallites or primary particles. The clusters of these primary crystallites or particles are also referred to herein as secondary particles, aggregates or agglomerates.

The secondary particles may be essentially uniform in size. For example, at least 80%, for example, at least 90%, for example at least 95% of the secondary particles may vary on average by less than 0.5 micron, for example, by less than 0.3 micron, for example, by less than 0.1 micron, as observed by a SEM and as measured by the average value of diameters, when the particles are approximated to spheres.

The secondary particles may be essentially spherical in shape. For example, at least 80%, e.g., at least 90%, e.g., at least 95%, of the secondary particles may have an aspect ratio of from 0.8:1 to 1:1 The secondary particles may appear as clusters of primary particles, having a broccoli-like morphology or appearance.

The primary crystallites may have a non-spherical shape. For example, the primary crystallites may have a smooth or roughened octahedral shape, which is more or less typical of certain faujasite type zeolite crystals. However, the primary crystallites may have other shapes, such as elongated or rod-like shapes.

When secondary particles are viewed, for example, in a SEM, only the exterior surfaces or shells of the secondary particles are visible. Consequently, the entire crystal morphology of the primary crystallites, as well as the interior of the secondary particles cannot be seen. Accordingly, the secondary particles of the present invention may possess or lack primary crystallites in the interior regions of the secondary particles, which cannot be observed by a SEM. Also, the primary crystallites may or may not be elongated along an axis extending from the center of the secondary particles to the center of the surface of the crystallite as observed in a SEM.

In aggregates of individual primary crystallites, spaces exist among individual primary crystallites. These spaces provide pore spaces, especially, mesopores. In contrast, stacking faults within an individual crystallite do not provide pore spaces. One or more stacking faults may exist within an individual primary crystallite.

The secondary particles may have an external surface area of 10 m$^2$/g or more. For example, the secondary particles may have an external surface area of 20 m$^2$/g or more, especially after calcination or steaming. Conventional forms of zeolite Y, such as those having non-aggregated primary particles with a size of 1 micron or more, tend to have an external surface area of less than 10 m$^2$/g. The relatively high external surface area of the secondary particles is an indication that these particles have gaps between individual primary particles and mesopores in the internal regions of the secondary particles. A single crystal of comparable size in the form of a generally spherical shape with angularity or edges developed would be expected to have a smaller external surface area.

The centers of the secondary particles may be less dense than the edges of the secondary particles, as measured by Transmission Electron Microscope (TEM). This lack of density in the centers of the secondary particles is a further indication that these secondary particles are an agglomeration of primary particles, rather than a single large crystal.

Elemental mapping of secondary particles may reveal that the Si/Al ratio is uniform throughout the secondary particles. This uniform Si/Al ratio provides a further indication that these secondary particles are an agglomeration of primary particles, rather than a single large crystal or large particles with aluminum- or silicon-rich amorphous core.

The synthetic faujasite zeolite in the aggregates may have a silica to alumina ratio of less than 4:1, for example, from 2:1 to less than 4:1. Examples of such synthetic faujasite zeolites include zeolite X with a silica to alumina ratio of from 2:1 to less than 3:1 and zeolite Y with a silica to alumina ratio of from 3:1 to less than 4:1.

The aggregates of synthetic faujasite zeolite may be combined with at least one hydrogenating metal component to form a catalyst suitable for hydrocracking. Examples of such hydrogenating metal components include a noble metal or metals or a non-noble metal or metals. Suitable noble metals include platinum, palladium, and other members of the platinum group such as iridium and rhodium. Suitable non-noble metals include those of Groups VB, VIB and VIIIB of the Periodic Table of Elements. Preferred non-noble metals are chromium, molybdenum, tungsten, cobalt and nickel and combinations of these metals such as cobalt-molybdenum, nickel-molybdenum, nickel-tungsten and cobalt-nickel-tungsten. Non-noble metal components may be pre-sulfided prior to use by exposure to a sulfur-containing gas such as hydrogen sulfide at an elevated temperature to convert the oxide form to the corresponding sulfide form of the metal. The catalyst may also be combined with a binder material and used in hydrocracking processes as described in the Absil et al U.S. Pat. No. 5,620,590.

The aggregated form of synthetic faujasite zeolite may have a mesopore volume of at least 0.025 cc/g, particularly in the inter-crystalline regions of the aggregates. Non-aggregated forms of synthetic faujasite zeolite would lack mesopores, i.e. pores having a diameter from 20 to 300 Angstroms. The unit cell size (UCS) of the synthetic faujasite zeolite may be 25 Angstrom or less.

Sources of alumina for preparing aggregates of small size synthetic faujasite zeolite may be in the form of a soluble salt, preferably the sodium salt and is commercially available from US Aluminate. Other suitable alumina sources include other aluminum salts, such as the chloride, aluminum alcoholates or hydrated alumina such as gamma alumina, pseudoboehmite and colloidal alumina. A particular source of alumina is sodium aluminate.

The silica source for preparing aggregates of small size synthetic faujasite zeolite may be a precipitated silica, such as Ultrasil PM Modified®. Other silica sources include powdered silica including precipitated silica such as Zeosil® and silica gels, silicic acid colloidal silica such as Ludox® or dissolved silica. In the presence of a base, these other silica sources may form silicates. According to certain particular embodiments exemplified herein, a sodium silicate solution is used as a source of silica. According to other particular embodiments exemplified herein, a precipitated silica, particularly Ultrasil PM Modified®, is used as a source of silica. The reaction mixture for forming the aggregates of small size synthetic faujasite zeolite may comprise a $SiO_2/Al_2O_3$ molar ratio of 10 or more, an $H_2O/Si$ molar ratio of 30 or less and an $OH^-/Si$ molar ratio of 0.9 or less. In particular, the reaction mixture for forming the aggregates of small size faujasite zeolite may comprise a $SiO_2/Al_2O_3$ molar ratio of from 10 to 20, an $H_2O/SiO_2$ molar ratio of from 21 to 30, an $OH^-/SiO_2$ molar ratio of from 0.65 to 0.90, and a $Na^+/SiO_2$ molar ratio of 1.1 to 2.0.

Aggregates of faujasites obtained by the process of this invention may be ion-exchanged with a rare-earth element such as lanthanum, cerium, praseodymium, or neodymium. Suitable precursors of the rare-earth can be their inorganic salts such as sulfate, nitrate, chloride, or mixtures thereof. The exchange can be conducted in an aqueous or non-aqueous solvent such as methanol, ethanol, and the like. The exchange can be conducted at a temperature from ambient to up to 90° C. The exchange process can be repeated in order to achieve desired rare-earth level. The rare-earth exchanged aggregates of faujasites can be used as solid acid catalysts for a variety of catalytic applications.

Aggregates of faujasite zeolites may be molded into, e.g., spherical or columnar pellets by means of a clay binder or the like and then subjected to ion exchange with Li ions or Ca ions and activated, for example, at 400° C. for about 1 hour, to obtain an adsorbent separator having a high adsorption performance, particularly nitrogen adsorption performance. Aggregates of faujasite zeolites obtained by the process of the present invention are useful as a zeolite adsorbent separator to separate and concentrate oxygen from a gas mixture of oxygen and nitrogen by an adsorption method.

Aggregates of faujasite zeolites are also useful as adsorbents for carbon dioxide. Such adsorbents are described, for example, in the Ojo et al U.S. Pat. No. 5,531,808. For example, a gas stream may be purified by the removal of carbon dioxide from the gas stream by passing the gas stream through a bed of aggregates of faujasite zeoliite at a temperature in the range of about −50° C. to about 80° C. The process can be used to purify a gas that is less polar than carbon dioxide and which contains carbon dioxide as an impurity at partial pressures up to about 25 mbar or more. Typical of gases that can be purified by removal of carbon dioxide are air, flue gas, nitrogen, oxygen, argon, hydrogen, helium, methane, etc.

Example 1

Preparation of NaY Using Chilled Starting Solutions
[Sample A (Invention) and Sample B (Comparative)]

An amount of 12.3 g of sodium aluminate was dissolved in 258 g of deionized (DI) water, and the solution was chilled to 0° C. in an ice/water bath. In a separate container, 200 g of sodium silicate solution (27% $SiO_2$) was mixed with 52 g of 50% sodium hydroxide solution and the mixture chilled to 0° C. in an ice/water bath. With vigorous stirring, the sodium aluminate solution was slowly added to the sodium silicate solution; and the stirring was maintained for 1 h. The gel was then taken out of the bath and allowed to warm up to room temperature. The gel was divided into two equal portions A and B; and 7 g of concentrated sulfuric acid was added to portion B. Both samples A and B were transferred into polypropylene bottles and allowed to age at room temperature for 16 h; after which period, they were put into a steam box (98° C.) and heated without stirring for 6 h. The solid was filtered and washed with an ample amount of DI water and dried in an oven at 100° C. overnight. The sample without the addition of sulfuric acid is referred to herein as Sample A; while the one with sulfuric acid added is referred to herein as Sample B.

The composition of the reaction mixture for Samples A and B is summarized in the following Table.

| Molar Ratio | Sample A | Sample B |
|---|---|---|
| $SiO_2/Al_2O_3$ | 16 | 16 |
| $H_2O/SiO_2$ | 26 | 26 |
| $OH^-/SiO_2$ | 0.72 | 0.57 |
| $Na^+/SiO_2$ | 1.6 | 1.6 |

Figure 2:
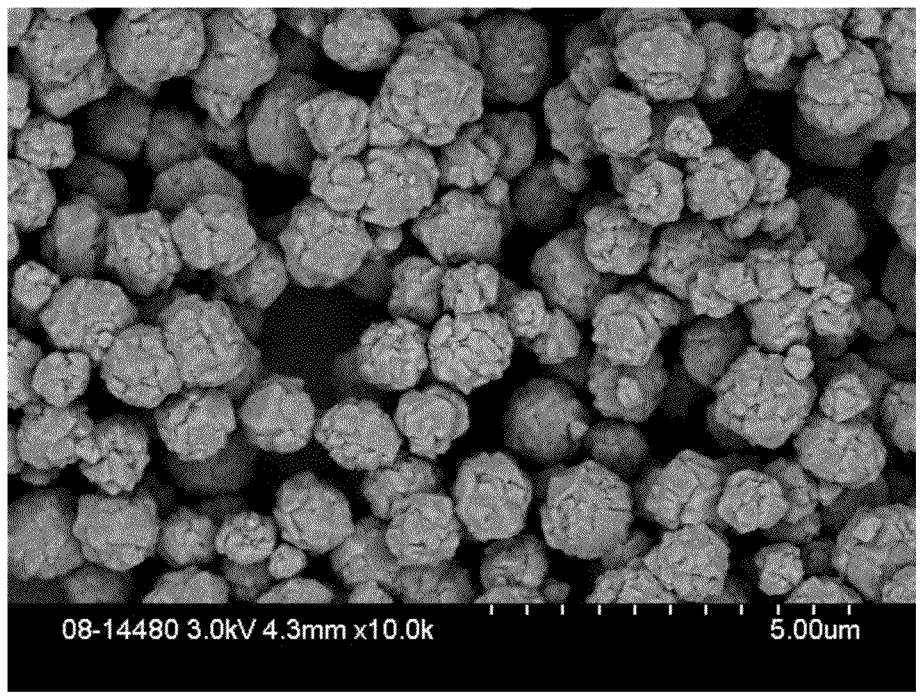

Scanning electron microscope images of Sample A are listed in FIGS. 1 and 2, respectively. X-ray diffraction (XRD) patterns reveal that Sample A is faujasite; while Sample B is an amorphous material, resulting from the addition of sulfuric acid to the gel.

Figure 3:
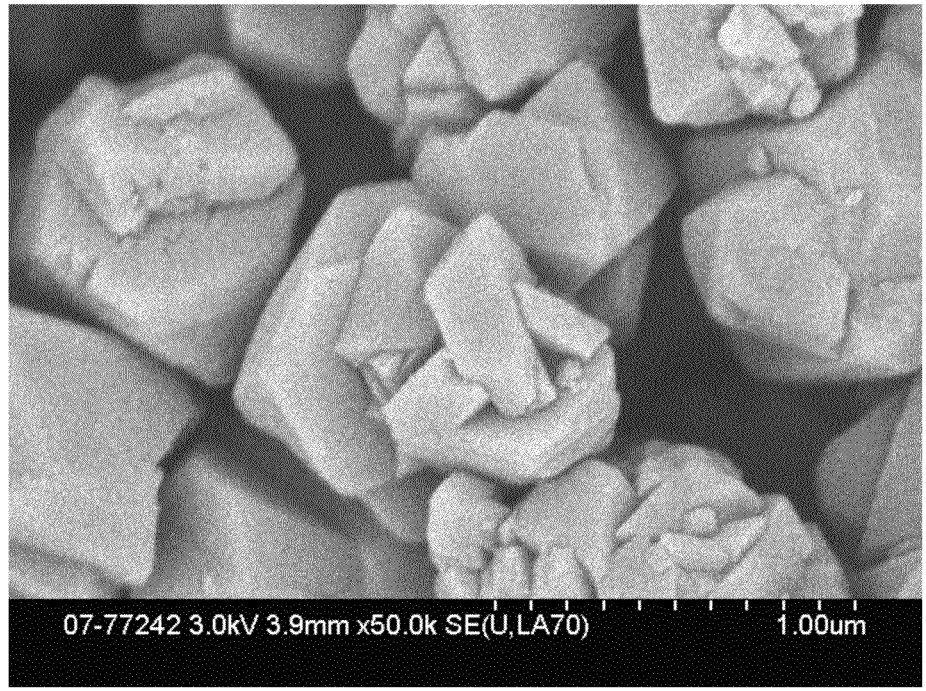
FIG. 3 is a scanning electron microscope (SEM) image of a commercial zeolite Y sample from Aldrich.
Figure 4:
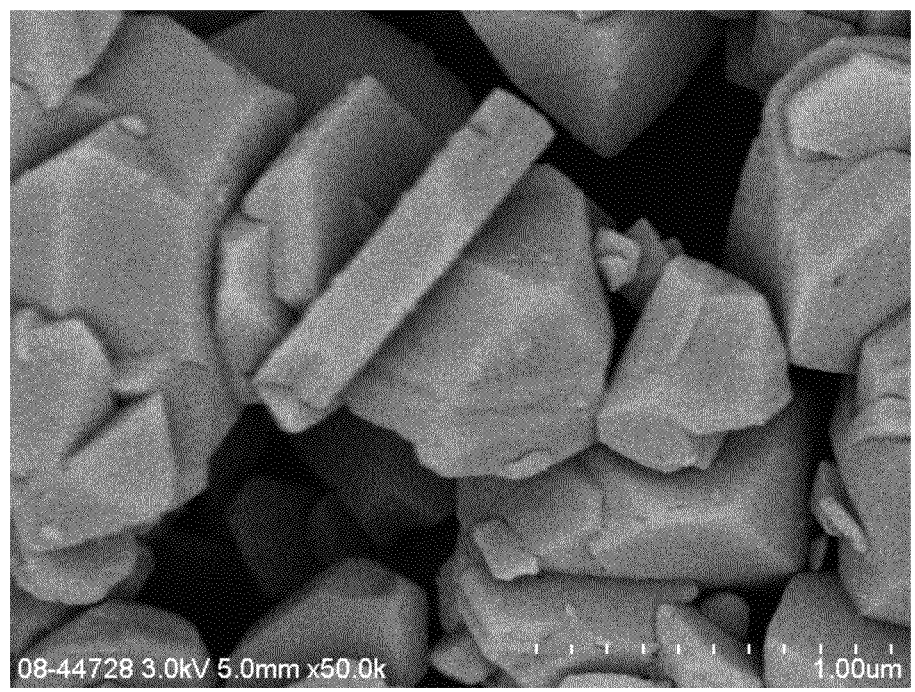
FIG. 4 is a scanning electron microscope (SEM) image of a commercial zeolite Y sample from Zeolyst International.

For comparison, FIG. 3 shows the SEM image of a commercial zeolite Y sample from Aldrich. FIG. 4 shows the SEM image of a commercial zeolite Y sample from Zeolyst International (CBV400).

It is clear that Sample A is a zeolite Y (faujasite), which consists of mainly particles of ~1 micron, which are aggregates of smaller particles of ~0.05-0.1 micron. A transmission electron microscope image of Sample A reveals that the center of the larger particle is less dense than the edge. Elemental mapping reveals that the Si/Al ratio is uniform throughout the particle, suggesting that the large particles are indeed true aggregates of smaller particles.

Example 2

Preparation of NaY Using the Room Temperature Starting Solutions (Sample C)

An amount of 12.3 g of sodium aluminate was dissolved in 258 g of DI water at room temperature. In a separate container, 200 g of sodium silicate solution (27% $SiO_2$) was mixed with 52 g of 50% sodium hydroxide solution at room temperature. With vigorous stirring, the sodium aluminate solution was slowly added to the sodium silicate solution; and the stirring was maintained for 1 h. The gel was transferred into a polypropylene bottle and allowed to age at room temperature for 16 h; after which period, it was put into a steam box and heated without stirring for 6 h. The solid was filtered and washed with an ample amount of DI water and dried in an oven at 100° C. overnight. This dried, solid material is referred to herein as Sample C.

The composition of the reaction mixture for Samples C is summarized in the following Table.

| Molar Ratio | Sample C |
| --- | --- |
| $SiO_2/Al_2O_3$ | 16 |
| $H_2O/SiO_2$ | 26 |
| $OH^-/SiO_2$ | 0.72 |
| $Na^+/SiO_2$ | 1.6 |

Figure 5:
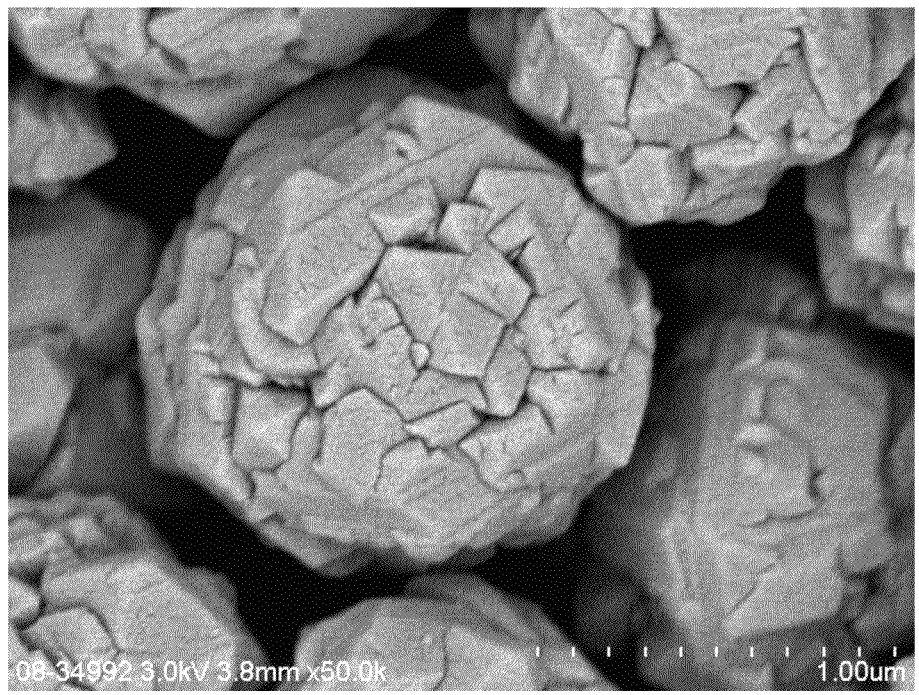
FIGS. 5 and 6 are scanning electron microscope (SEM) images of a NaY sample prepared in Example 2 herein.
Figure 6:
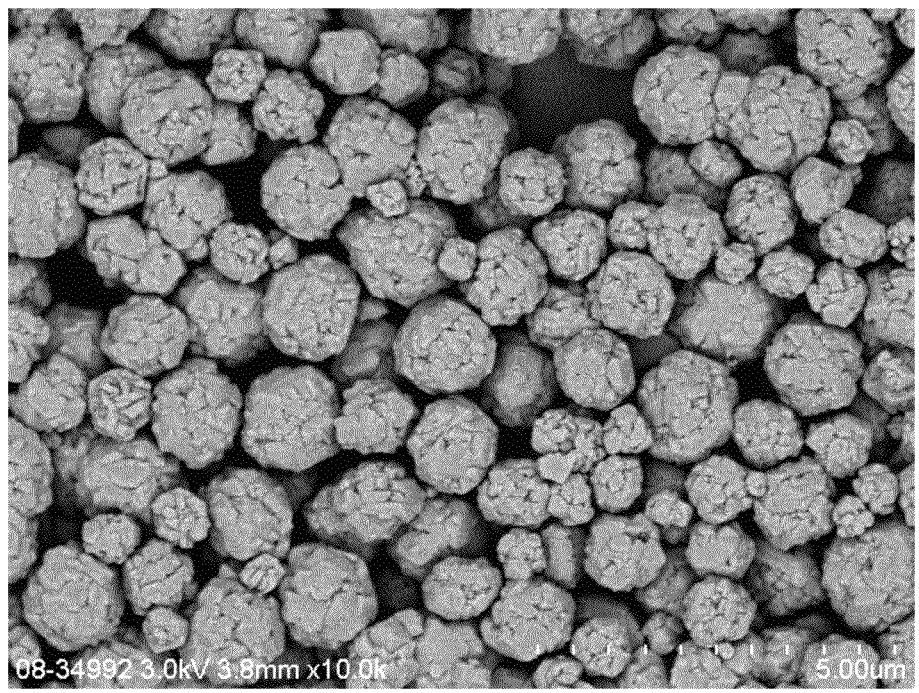

Scanning electron microscope images of Sample C are listed in FIGS. 5 and 6, respectively. An XRD pattern reveals that Sample C is crystalline faujasite. SEM images show that the crystals possess similar morphology to those of the low temperature preparation (Sample A).

Properties of the Y zeolite prepared in this invention are listed in Table I.

TABLE 1

Properties of zeolite Y.

| | Sample A | Sample C |
| --- | --- | --- |
| Surface area ($m^2/g$) | 857 | 843 |
| Micropore surface area ($m^2/g$) | 846 | 826 |
| External surface area ($m^2/g$) | 11 | 17 |
| Micropore volume (cc/g) | 0.36 | 0.36 |
| Mesopore volume (cc/g) | 0.03 | 0.036 |
| Typical secondary particle size (μ) | 1 | 1 |
| Elemental composition | | |
| Na (wt %) | 8.72 | 9.04 |
| K (wt %) | 0.0135 | 0.011 |
| $Al_2O_3$ (wt %) | 20.6 | 21 |
| $SiO_2$ (wt %) | 40.3 | 40.3 |
| $SiO_2/Al_2O_3$ (molar) | 3.33 | 3.26 |

FIGS. 1, 2, 5 and 6 provide a perspective of secondary particles composed primary crystallites in an aggregated form. The primary crystallites have an average width (i.e. a cross-sectional dimension in the plane of the SEM image) of 0.3 micron or less. The depth (i.e. dimension perpendicular to the plane of the SEM image) of the primary crystallites is not observable. The interior region of each secondary particle is also not observable from the SEM images. However, it can be observed that the average width of at least 80% (by number) of the secondary particles is 0.8 micron or more. At least 5 primary crystallites are observable in at least 80% of the secondary particles. Also, the ratio of the average width of the secondary particles to the average width of the primary crystallites is at least 5:1 in at least 80% of the secondary particles.

What is claimed is:

1. A hydrocracking catalyst comprising an aggregated form of synthetic faujasite zeolite comprising small size primary crystallites of synthetic faujasite zeolite, wherein at least 80% of the primary crystallites are aggregated to form secondary particles, the secondary particles consisting essentially of clusters of primary crystallites, wherein the silica to alumina molar ratio of the zeolite is less than 4:1, wherein the average width of the secondary particles, as viewed from the external surface of the secondary particles, is 0.8 micron or more; and wherein at least one of the following conditions apply:
   (a) the average width of the primary crystallites in the secondary particles, as viewed from the external surface of the secondary particles, is 0.3 micron or less;
   (b) at least 80% of the secondary particles comprise at least 5 primary crystallites; and
   (c) in at least 80% of the secondary particles, the ratio of the average width of the secondary particles to the average width of the primary crystallites is at least 5:1; and
   wherein the hydrocracking catalyst further comprising at least one hydrogenating metal component.

2. The hydrocracking catalyst of claim 1, wherein the secondary particles consist of clusters of primary crystallites.

3. The hydrocracking catalyst of claim 1, wherein the ratio of the average width of the secondary particles to the average width of the primary crystallites is at least 5:1, wherein the average width of the primary crystallites is 0.2 micron or less, and wherein at least 90% of the primary crystallites are aggregated to form secondary particles.

4. The hydrocracking catalyst of claim 1, wherein said secondary particles are essentially spherical in shape.

5. The hydrocracking catalyst of claim 1, wherein at least 80% of said secondary particles have an aspect ratio of from 0.8:1 to 1:1.

6. The hydrocracking catalyst of claim 1, wherein the external surface area of the secondary particles is 10 $m^2/g$ or more.

7. The hydrocracking catalyst of claim 1, wherein the external surface area of the secondary particles is 20 $m^2/g$ or more.

8. The hydrocracking catalyst of claim 1, wherein the centers of the secondary particles are less dense than the edges of the secondary particles, and wherein density is measured by TEM.

9. The hydrocracking catalyst of claim 1, wherein elemental mapping of secondary particles reveals that the Si/Al ratio is uniform throughout the secondary particles.

10. The hydrocracking catalyst of to claim 1, wherein said synthetic faujasite zeolite has a silica to alumina ratio of from 2:1 to less than 4:1.

11. The hydrocracking catalyst of claim 1 having a mesopore volume of at least 0.025 cc/g.

12. The hydrocracking catalyst of claim 1, wherein said synthetic faujasite zeolite has a unit cell size of 25 Angstroms or less.

13. The hydrocracking catalyst of claim 1, wherein the hydrogenating metal comprises a noble metal.

14. The hydrocracking catalyst of claim 1, wherein the hydrogenating metal comprises a non-noble metal selected from the group consisting of Group VB metals, Group VIB metals, Group VIIIB metals and combinations thereof.

* * * * *